United States Patent
Streun et al.

(10) Patent No.: US 7,098,434 B2
(45) Date of Patent: Aug. 29, 2006

(54) METHOD FOR EXTRACTING MEASURING SIGNALS FROM A MULTI-CHANNEL PHOTOMULTIPIER AND CORRESPONDING CIRCUIT

(75) Inventors: Matthias Streun, Aachen (DE); Horst Larue, Kerkrade (NL)

(73) Assignee: Forschungszentrum Julich GmbH, Julich (DE)

( * ) Notice: Subject to any disclaimer, the term of this patent is extended or adjusted under 35 U.S.C. 154(b) by 80 days.

(21) Appl. No.: 10/489,189

(22) PCT Filed: Aug. 1, 2002

(86) PCT No.: PCT/DE02/02820

§ 371 (c)(1),
(2), (4) Date: Mar. 8, 2004

(87) PCT Pub. No.: WO03/028067

PCT Pub. Date: Apr. 3, 2003

(65) Prior Publication Data

US 2004/0232315 A1    Nov. 25, 2004

(30) Foreign Application Priority Data

Sep. 11, 2001    (DE) ................ 101 44 764

(51) Int. Cl.
  *H01J 40/14*    (2006.01)
  *H01J 31/50*    (2006.01)
  *H01J 43/30*    (2006.01)
(52) U.S. Cl. .............. 250/207; 250/214 VT; 330/42; 330/59; 315/10
(58) Field of Classification Search ...... None
  See application file for complete search history.

(56) References Cited

U.S. PATENT DOCUMENTS 4,967,084 A    10/1990    Rich et al.

(Continued)

FOREIGN PATENT DOCUMENTS

GB    932 536    7/1963

OTHER PUBLICATIONS

Multi-Channel Readout of Crossed Wire . . . by A.J. Bird et al. (Elsevier Science B.V.—1994).

(Continued)

*Primary Examiner*—Stephone B. Allen
*Assistant Examiner*—Patrick J. Lee
(74) *Attorney, Agent, or Firm*—Andrew Wilford

(57) ABSTRACT

The invention relates to a method for extracting measuring signals from a multi-channel photomultiplier, characterised by the following steps: a measuring signal which is integral for the channels of the photomultiplier is extracted at the dynode in order to record the signal form and intensity of an event, and the anode signal of each channel is compared with a threshold value. If the threshold value is exceeded at a channel, the location of the detected event is determined and the associated signal form and intensity at the dynode is detected. The invention also relates to a circuit for a multi-channel photomultiplier (1), said circuit being used to carry out the method according to one of the claims 1 to 8. The circuit comprises a photocathode, a multi-channel structure for electron multiplication (dynode), and anodes (11) which are associated with the channels and are used for pixel-oriented charge amplification and collection. The dynode (12) is contacted and a comparator circuit (2) is provided for each channel of the anode (11) in order to extract a measuring signal.

15 Claims, 2 Drawing Sheets

U.S. PATENT DOCUMENTS 5,111,051 A * 5/1992 Watanabe ............... 250/363.02
5,338,937 A     8/1994 Daghighian et al.
5,401,951 A * 3/1995 Butler et al. ................ 250/207
5,493,111 A     2/1996 Wheeler et al.

OTHER PUBLICATIONS

Multilayer Anode With Crossed Serpentine Delay Lines . . . by P.G. Friedman et al. (Rev. Sci. Feb. 1996).

* cited by examiner

METHOD FOR EXTRACTING MEASURING SIGNALS FROM A MULTI-CHANNEL PHOTOMULTIPIER AND CORRESPONDING CIRCUIT

CROSS REFERENCE TO RELATED APPLICATIONS

This application is a national stage of PCT/DE 02/02820 filed 1 Aug. 2002 and is based upon German national application 101 44 764.7 of 11 Sep. 2001 under the International Convention.

FIELD OF THE INVENTION

The invention relates to a method of extracting measurement signals from multichannel photomultipliers as well as to a circuit for a multichannel photomultiplier with a photocathode, a multichannel structure for electron multiplication (dynode) and anodes associated with the channels for pixel-oriented charge amplification and accumulation.

BACKGROUND OF THE INVENTION

Photomultipliers can convert the smallest light excitation signals into electrical signals in that individual electrons which are released by photons in the vacuum of the photomultiplier tube can be accelerated and at so-called dynodes can produce an avalanche of secondary electrons. In multichannel photomultipliers (MCPMT for short), the electron multiplication stages of the dynode are configured as individual channels. Each inlet region of the cathode is thus associated with an anode pin at the output. The multichannel photomultiplier functions, therefore like a multiplicity of tightly packed individual photomultipliers. A coupling of the channels rises only in that the channels formed by the dynodes are electrically connected together. The charges which arise at the isolated anodes of the channels are thus a significantly amplified image of the light distribution over the photocathode, whereby a locally precise arrangement of the light excitation is given by the channel pixels.

With multichannel photomultipliers, a detection of scintillation excitations or events can be captured with excellent spatial or positional resolution as is required, for example, in nuclear medicine. Position-sensitive detectors are known, for example in small animal PET scanners which embody such devices capable of local resolution. They use the position sensitive photo multipliers and can extract the measurement signal in accordance with center of mass principles or center of mass formation. With these photomultipliers, the amplifying electron clouds do not travel within separate channels as in multichannel photomultipliers but only the anodes are separated and usually configured in the form of a wire grid. Depending upon the position of the light event, charge levels can be differentiated on the individual wires of the grid, whereby the mutually parallel wires are collected together by means of a resistance ladder. From the ratio of the pulse intensities at the ladder ends, the location of the light event respectively in one or the other dimension of the detector surface can be determined corresponding to its center of gravity formation. The information of the total charge is delivered in the form of the sum of the four pulses.

The signal readout in accordance with the center of gravity formation principle requires therefore four analog to digital convert channels for an individual location sensitive photomultiplier. Furthermore, this principle is sensitive to disturbance signals noise since in addition to the intensity of the light pulses to be detected, the location information is coded into the pulse level variations and thus extremely small pulses can arise. Correspondingly the dynamics of the measured value acquisition must satisfy high quality requirements. Aside from this, the resistance ladders which are connected to the wire grid anode have unequal impedances at the anodes which can be the origin of locally-dependent pulse-shaped distortions. Thus problems can arise in the use of this system which can require pulse shape analysis. Furthermore, in the reading process the center of gravity formation approach may be disadvantageous since it may not be able to distinguish whether a light pulse is sharp at any given location or has been blurred or spread to simultaneously appear as if it arises from a number of locations. The latter case can arise when a gamma particle causes scattering in a scintillator which brings about a secondary scintillation at a location spaced from the initial scintillation.

Multichannel photomultipliers, of course, have separate output signals for each channel. Correspondingly, pixel-oriented measurement signals could be acquired with shape and intensity. With a large pixel count, therefore, extensive readout electronic circuitry must be provided and for the further data processing, for each channel an analog/digital converter is also required. As a result only unusually small systems with a reduced pixel count can work with such a readout method. Alternatively, the integrated pulse could be integrated by sample-and-hold stages so that they then can be read out via a multiplexer. This is however a drawback since information as to the pulse shape and the precise point in time that a pulse was created will be lost. In addition, because of the serial readout, the maximum event read which can be handled in this system is strongly limited.

OBJECT OF THE INVENTION

It is the object of the invention to provide a readout method and a circuit for a multichannel photomultiplier with which a pixel-oriented signal acquisition, including evaluation of both pulse intensity and pulse shape, is possible with minimum cost.

SUMMARY OF THE INVENTION

This object is achieved with a method that has the following steps:
   extracting at the dynode an integral measuring signal for the channels of the photomultiplier in order to record the signal shape and signal intensity of an event and comparing the anode signal of each channel with a threshold value,
   whereby upon the compared signal exceeding the threshold value at a channel the location of the detected event is established and the associated signal shape and signal intensity at the dynode is detected.

The object is further so achieved by a circuit as described at the outset which acquires a measurement signal by contacting the dynode and providing each channel of the anode with a comparison circuit (comparator).

By extracting the signals which arise at the dynode, the pulse intensity and pulse shape or form of an event can be detected independently of the location of the event. The voltage course at the dynode corresponds namely to the current pulse at the anode and has only an inverse polarity.

Thus at the dynode each pulse is independent of which channel the event has occurred. As a result for acquisition of the signal form and signal intensity the evaluation of the summation signals arising at the dynode will suffice. To enable however simultaneously a localization of the measured event, the anode signal at each channel is compared with a threshold value so that upon exceeding the threshold value at the comparator of the associated channel, a pixel oriented localization of the event is established and simultaneously the signal shape and signal intensity belonging to this event is detected at the dynode.

By comparison with a multichannel photomultiplier circuit for which separate evaluation electronic circuitry is provided for each channel, the circuit of the invention enables only signal shape and signal intensity evaluation of the diode signals integrated for all channels and thus need be enhanced only by simple comparator circuits for each individual channel.

According to the method of the invention, there is the further feature that, upon overstepping of the threshold value, a logic bit is provided or set for the respective channel. The bits of the respective channel enable in a simple digital way a determination of the timing of the event and by the identification of the channel which is associated with the respective bit, a two-dimensional pixel-oriented localization of the event.

Since for each of these bits, the signal shape and signal intensity is read out at the dynode, the readout of the signal shape and signal intensity at the dynode represents a registration of the event (upon overstepping of the threshold at at least one channel).

When the signal shape and signal intensity extracted at the dynode are continuously stored, it can be assured that also the part of the signal shape has been acquired from the measurement system which is applicable to each point in time for the generation of the logic bits upon exceeding the threshold value. Preferably this intermediate storage is achieved with a so-called free running digitalization in which the dynode signal over the analog/digital converter is permanently transferred to a shift register or ring register.

Preferably the signal shape and signal intensity is extracted at the last stage of the dynode since there the electrical signal is the strongest.

In the readout of a multichannel photomultiplier which is equipped with a matrix of individual scintillator crystals, a perfect channel separation unfortunately cannot be achieved. Possible reasons for this are the limited optical isolation of the crystals from one another, inexact placing of the crystals over the channels, channel cross-talk within the photomultiplier and capacitive cross-talk between conductors of the evaluating electronic circuitry. These channel separation defects give rise, to erroneous signalling of events in the case of individual channel triggering when a smaller threshold (trigger point) is selected since the reduced trigger points may already be exceeded by a signal having its origins in cross-talk.

As a consequence, in a further refinement of the invention it is proposed to invert the measurement signal of the dynode and to amplify it as required to modulate the threshold value. The measurement signal which is derived from the dynode is then applied to the threshold value. The trigger point is then briefly raised and the signals arriving with the primary signal must then exceed this elevated threshold value to be registered as an event. If the part of the primary signal which is utilized for the purpose of lifting the threshold value is greater than the maximum cross-talk which may arise, the cross-talk signals are fully suppressed. Through this modulation by the measurement signal which is acquired from the dynode, there is simultaneously no limitation as far as the detectable dynamic range of the primary signal is concerned.

When the signal acquired at the dynode is digitalized and the measurement data is processed for local determination of the event (logic bit) and the signal shape and signal intensity in a digital manner, the evaluation of the measurement signals is more flexible since digital data acquisition can be used.

From the point of view of the device according to the invention, the circuit is provided for contacting the dynode at the last stage which allows the signal for further processing to have the maximum amplification.

When a voltage source with an adjustable threshold voltage is provided for the comparator circuit, the threshold can be set, depending upon the use of the circuit, for different applications at corresponding predetermined or preadjustable threshold voltages. At the contacting of the dynode, a measured signal amplifier is connected to avoid influencing the measurement signal within the photomultiplier by the acquisition of the dynode signal.

For further digital signal processing it is advantageous to provide measured signal processing at the contacting of the dynode with an analog/digital converter preferably having upstream thereof a low-pass filter and, for intermediate storage of the digitalized measurement signal, a shift or ring register. The low-pass filter serves to fulfill the Nyquist conditions in the subsequent digitalization corresponding to the selected sampling rate. With the shift or ring register, a free-running digitalization is ensured whereby part of the pulses to be registered which are acquired in time may precede the overstepping of the threshold value (occurrence of the trigger signal).

Since a trigger circuit is provided with which the readout of the register is initiated, the timing of the registered events as well as the associated registration of the signal shape and signal intensity are achieved from the register. If desired, a delay circuit can be provided which can await the complete arrival of the signal shape in the register so that the signal can be registered in the desired signal length. When between the contacting of the dynode and the voltage source for the threshold voltage, an inverting amplifier is provided which modulates the threshold voltage with the summation signal which is coupled out of the dynode, a multivalued dependency of the increase in the threshold value is realized so that cross-talk signals are filtered out of the channels which are adjoining the single result detecting channel.

The method which has been described according to the invention is not necessarily limited to the readout of measurement signals from multichannel photomultipliers. It can also be used effectively for semiconductor detectors, like for example photodiodes. In this case, the dynode signal which would otherwise not be available, must be generated by an analog adder (summing amplifier) which sums up the signals of the individual semiconductor pixels. Otherwise the readout method for the semiconductor detector corresponds to the process described.

BRIEF DESCRIPTION OF THE DRAWING

Reference is now made to the following description of two embodiments in conjunction with the accompanying drawing. In the drawing there is seen.

SPECIFIC DESCRIPTION

Figure 1:
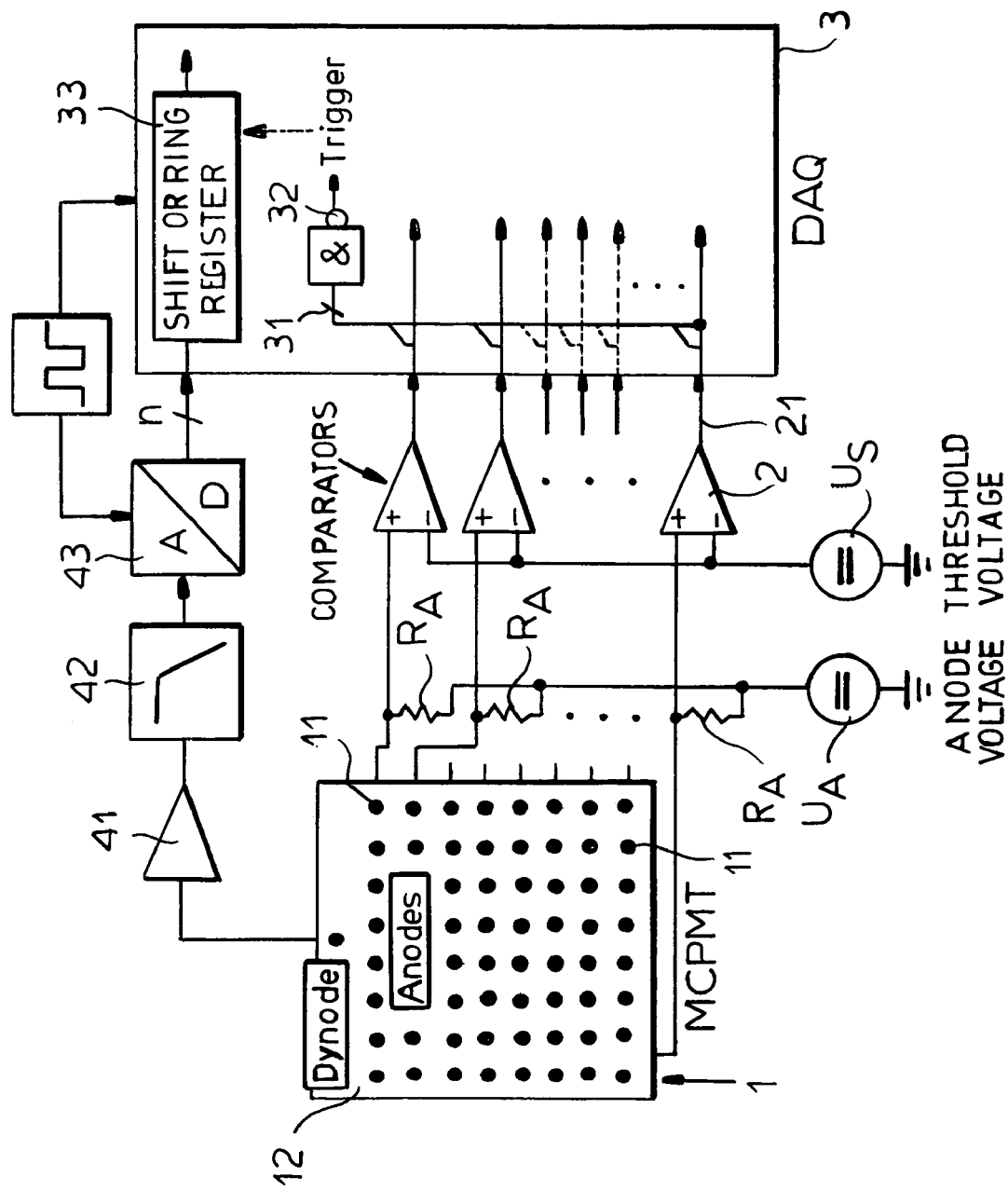
FIG. 1 a circuit diagram of the principles of the readout of measurement signals from a multichannel photomultiplier according to the invention.

In FIG. 1 a diagram of the principles of readout of measurement signals from a multichannel photomultiplier is shown. A multichannel photomultiplier is schematically illustrated with a pixel oriented 8×8 anode arrangement 11 having, additionally connected to the last stage of the dynode 12 of the multichannel photomultiplier 1. Each of the anodes 11 associated with a respective pixel is biased through a resistance $R_A$ as a direct voltage $U_A$ as the anode voltage. Simultaneously each anode 11 is connected to a comparator 2 whose comparator potential on reference potential is derived from a voltage source which in this case is the threshold potential $U_S$.

Should a negative charge cloud (electron cloud) arrive at an anode 11, it generates a current flowing through the resistance $R_A$ to produce a negative voltage pulse. If the voltage pulse is below the threshold voltage $U_A$, the respective comparator 2 changes its output state (logic bit) and provides an indication of an event at the corresponding channel. The detection sensitivity can be matched by a variation in the voltage difference $U_A$–$U_S$ (whereby $U_S$ must be less than $U_A$).

The comparator output 21 of comparator 2 supplies as the measurement signal a respective logic bit to the digital evaluation circuit 3. That circuit recognizes a presented logic bit (here low activity) to indicate that an event has occurred at a certain point in time and supplies based upon the set logic bits the pixel oriented locality information for each respective channel. Through a NAND logic combination of all channels in the data evaluation unit 3 a trigger signal is generated that provides information as to whether an event has been acknowledged. When an event is acknowledged in accordance with the trigger signal 32, the stored and digitalized dynode signal is used for further information with respect to the pulse shape, the exact point in time and the total charge of the pulse.

At the contact for the signal from the dynode 12 a measurement signal amplifier 42 is provided to which a low-pass filter 42 and then an analog digital converter 43 are connected. Correspondingly, the dynode signal is amplified and filtered in the low-pass filter to fulfill the Nyquist conditions, whereupon the signal is digitized in an analog-to-digital converter 43.

In the data evaluation unit 3 a shift or ring register 43 is provided in which the oncoming measurement signal from the dynode contacting through the analog-digital converter can be digitally stored in an intermediate memory.

If the trigger signal 32 triggers an event in the data evaluation circuit 3, pulse parts of the pulse shape to be registered can be read from the shift or ring register 33 in a timely manner prior to the trigger signal. Thus the trigger signal 32 effects the reading of the register 33 with a delay so that at the readout point in time, the complete pulse from a time point of view is taken up in the register. The data set belonging to each event recognized by the multichannel photomultiplier is thus comprised of the digitalized pulse which yields the signal shape and signal intensity, and the bit pattern of the channel bits which permit pixel oriented localization of the event. This data set can be subjected to further processing by appropriate hardware or software.

Figure 2:
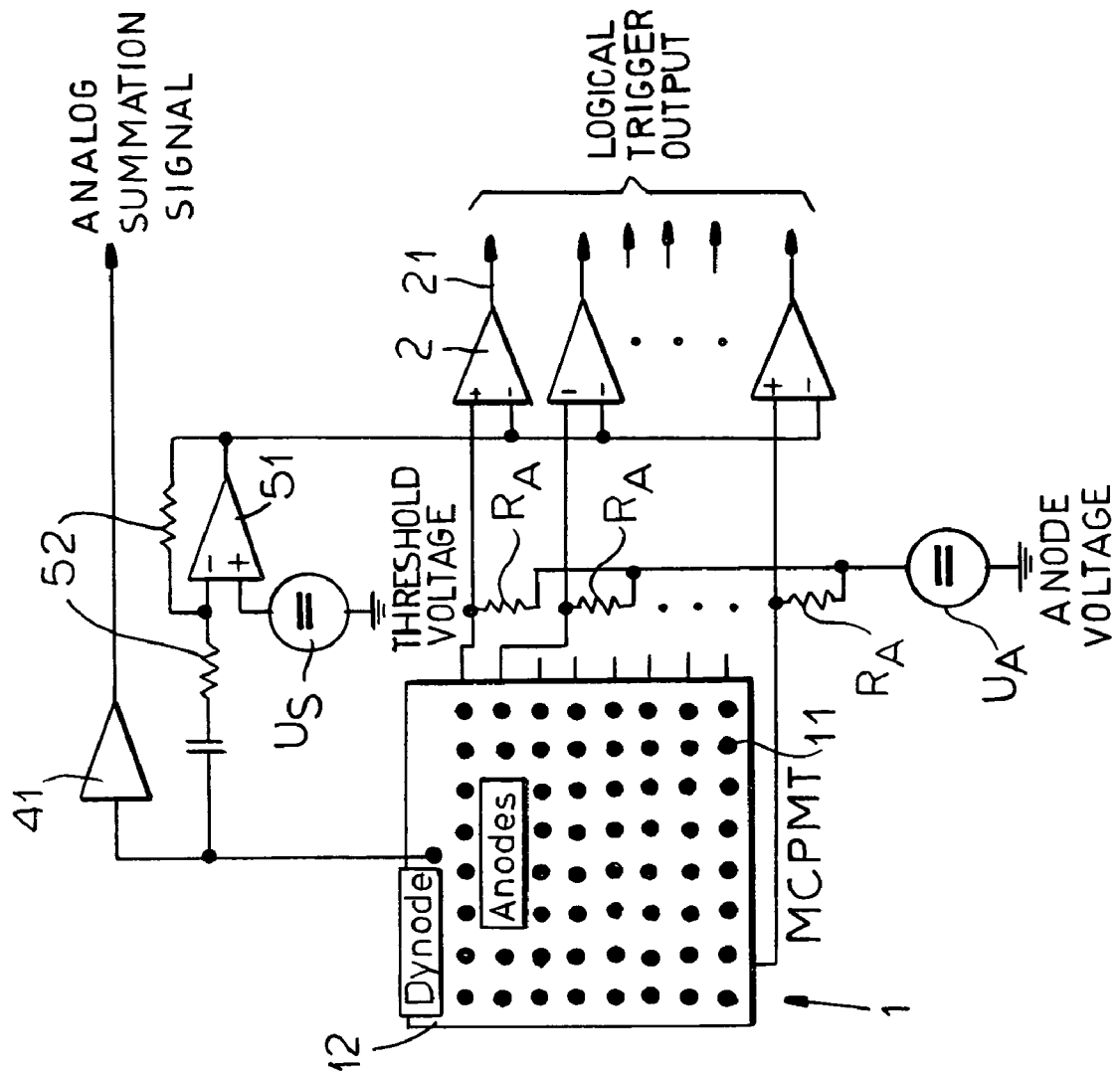
FIG. 2 a basic circuit diagram corresponding to FIG. 1 additionally with cross-talk suppression.

In FIG. 2 a basic circuit diagram for the readout of measurement signals from multichannel photomultipliers corresponding to that of FIG. 1 is given with an additional cross-talk suppression. Corresponding parts to that of FIG. 1 are indicated with the same reference characters.

The circuit of FIG. 2 is expanded beyond that described in connection with FIG. 1 by an inverting amplifier 51 so connected that the threshold voltage $U_S$ is modulated by the integral measurement signal derived at the contacting 12 of the dynode. The inverting amplifier 51 is required since negative current pulses arise at the anodes but the signal at the dynode contacting has positive polarity. By negative feedback resister 52, an amplification or damping of the amplifier is effected. The setting is so chosen that all cross-talk signals are suppressed.

The invention claimed is:

1. A method of reading out measurement signals from a multichannel photomultiplier, comprising the steps of:
   extracting an integral measurement signal for channels of the photomultiplier at a dynode thereof to register a signal shape and signal intensity of a detected event, and
   comparing the anode signal of each channel with a threshold value,
   whereby upon overstepping of a threshold value at a channel, a location of the detected event is established and the associated signal shape and signal intensity at the dynode is acquired.

2. The method according to claim 1 wherein upon overstepping of the threshold value a logic bit is set at the respective channel.

3. The method according to claim 2 wherein with the set bit, the signal shape and signal intensity at the dynode is read out.

4. The method according to claim 1 wherein the signal shape and signal intensity extracted at the dynode is continuously subjected to intermediate storage.

5. The method according to claim 4 wherein the readout of the signal shape is subjected to a time delay.

6. The method according to claim 1 wherein the signal shape and signal intensity is extracted at the last stage of the dynode.

7. A method of reading out measurement signals from a multichannel photomultiplier, comprising the steps of:
   extracting an integral measurement signal for channels of the photomultiplier at a dynode thereof to register a signal shape and signal intensity of a detected event, and
   comparing the anode signal of each channel with a threshold value,
   whereby upon overstepping of a threshold value at a channel, a location of the detected event is established and the associated signal shape and signal intensity at the dynode is acquired wherein The measured signal of the dynode is inverted, amplified if necessary and used to modulate the threshold value.

8. The method according to claim 1 wherein the signal extracted at the dynode is digitalized and the measurement data for the localization of the event as well as the signal shape and signal intensity are digitally further processed.

9. A circuit for a multichannel photomultiplier for practicing a method of reading out measurement signals therefrom by the steps of:
   extracting an integral measurement signal for channels of the photomultiplier at a dynode thereof to register a signal shape and signal intensity of a detected event, and
   comparing the anode signal of each channel with a threshold value,
   whereby upon overstepping of a threshold value at a channel, a location of the detected event is established and the associated signal share and signal intensity at the dynode is acquired, said circuit comprising a photocathode, a multichannel structure for electron multiplication including a dynode and anodes associated with the channels for pixel oriented charge amplification and charge collection, a contact for the dynode being provided for extracting the measurement and signal, each channel of the anode being provided with a comparator.

10. The circuit according to claim 9, characterized in that the contact for the dynode is arranged at the last stage of dynode.

11. A circuit for a multichannel photomultiplier for practicing a method of reading out measurement signals therefrom by the steps of:

extracting an integral measurement signal for channels of the photomultiplier at a dynode thereof to register a signal shape and signal intensity of a detected event, and comparing the anode signal of each channel with a threshold value, whereby upon overstepping of a threshold value at a channel, a location of the detected event is established and the associated signal shape and signal intensity at the dynode is acquired, said circuit comprising a photocathode, a multichannel structure for electron multiplication including a dynode and anodes associated with the channels for pixel oriented charge amplification and charge collection, a contact for the dynode being provided for extracting the measurement and signal, each channel of the anode being provided with a comparator a voltage source with a presettable threshold voltage being provided for said comparators.

12. The circuit according to claim 11 wherein the contact for the dynode has a measured signal amplifier connected to it.

13. The circuit according to claim 11 wherein for measured signal processing an analog-to-digital converter is connected to the contact of the dynode, with a low-pass filter located upstream thereof, as well as a shift register or ring register for intermediate storage of the digital measured signal.

14. The circuit according to claim 13, wherein a trigger circuit is provided with which the readout of the register is triggered.

15. The circuit according to claim 11, wherein between the contact of the dynode and the voltage source for the threshold voltage, an inverting amplifier is arranged which modulates the threshold voltage with a summation signal derived at the dynode.

* * * * *